(12) United States Patent
Li et al.

(10) Patent No.: US 9,477,899 B2
(45) Date of Patent: Oct. 25, 2016

(54) SYSTEM AND METHOD FOR DIFFERENTIATING TYPE OF VEGETATION FROM REMOTELY SENSED DATA

(71) Applicant: WEYERHAEUSER NR COMPANY, Federal Way, WA (US)

(72) Inventors: Yuzhen Li, Shoreline, WA (US); Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 358 days.

(21) Appl. No.: 14/297,039

(22) Filed: Jun. 5, 2014

(65) Prior Publication Data

US 2015/0356721 A1 Dec. 10, 2015

(51) Int. Cl.
*G06K 9/00* (2006.01)
*G06K 9/46* (2006.01)

(52) U.S. Cl.
CPC .............. *G06K 9/46* (2013.01); *G06K 9/00657* (2013.01)

(58) Field of Classification Search
USPC ............... 382/110, 164, 165, 190, 290, 274; 348/135, 143, 161
See application file for complete search history.

(56) References Cited

U.S. PATENT DOCUMENTS

| | | | | |
|---|---|---|---|---|
| 5,130,545 A * | 7/1992 | Lussier | ..................... | A01G 7/00 250/458.1 |
| 6,535,158 B2 * | 3/2003 | Wilkerson | .............. | G01P 5/001 342/104 |
| 6,567,537 B1 * | 5/2003 | Anderson | .......... | G06K 9/00657 382/110 |
| 6,664,529 B2 * | 12/2003 | Pack | ....................... | G01S 7/481 250/208.1 |
| 7,046,841 B1 * | 5/2006 | Dow | ...................... | G01C 11/00 345/419 |
| 7,353,113 B2 * | 4/2008 | Sprague | ................ | G06Q 10/06 405/36 |
| 7,474,964 B1 | 1/2009 | Welty et al. | | |
| 8,537,338 B1 * | 9/2013 | Medasani | .............. | G01C 21/32 356/4.01 |

OTHER PUBLICATIONS

Reutebuch, Steve, "LIDAR: An Emerging Tool for Multiple Resource Measurement, Planning and Monitoring", Western Forester, Society of American Foresters, Mar./Apr. 2008, pp. 1-5, vol. 53, US.
Haugerud, Ralph, "A Model Specification for LIDAR Surveys in the Pacific Northwest", Western Forester, Society of American Foresters, Mar./Apr. 2008, pp. 6-7, vol. 53, US.
McFadden, George, "Developing a Stand-Level Inventory Using LIDAR", Western Forester, Society of American Foresters, Mar./Apr. 2008, pp. 8-9, vol. 53, US.
Schiess, Peter, "The Impact of LIDAR Technology on Transportation System Design: Moving from Coarse Topographic Maps to Detailed Digital Elevation Models," Western Forester, Society of American Foresters, Mar./Apr. 2008, pp. 10-13, vol. 53, US.
U.S. Appl. No. 14/142,341, filed Dec. 27, 2013.

* cited by examiner

*Primary Examiner* — Yosef Kassa
(74) *Attorney, Agent, or Firm* — Perkins Coie LLP

(57) ABSTRACT

A computer system is programmed to analyze data from aerial images and LiDAR data obtained from a region of interest in order to determine whether a group of LiDAR data points representing an individual item of vegetation (i.e. a blob) is a particular type of vegetation. Infrared data from aerial images of the region of interest is stretched and divided by red spectral data to compute an objective-stretched vegetation index value (OVI) for a pixel. The mean LiDAR intensity and the mean OVI for the LiDAR data points and the pixels in the area of a blob are used to predict what type of vegetation is represented in the area of the blob.

7 Claims, 9 Drawing Sheets

SYSTEM AND METHOD FOR DIFFERENTIATING TYPE OF VEGETATION FROM REMOTELY SENSED DATA

TECHNICAL FIELD

The technology disclosed herein relates to systems and methods for analyzing data from aerial images and light detection and ranging (LiDAR) data that are obtained from a region or area of interest in order to differentiate between different types of vegetation such as between hardwoods and conifers at an individual tree level.

BACKGROUND

In managed forests, there is an ongoing need to be able to inventory the types of trees that are growing in a given area. For example, in conifer forests, hardwood trees may be initially be viewed as an undesirable species that should be removed because they compete for water and nutrients with a desired species. However, if the hardwoods grow to such a size that they become harvestable, then the trees have their own value and should be inventoried.

As managed forests become increasingly large, it is too costly to physically inventory all the areas of the forest. Therefore, remote sensing technology is becoming increasingly used to provide information about the types and ages of trees that are in the forest.

SUMMARY

As will be explained in detail below, the disclosed technology uses a combination of data from aerial and satellite images along with LiDAR data obtained from an area of interest in order to identify various species of vegetation. In one embodiment, spectral data from aerial and satellite images are analyzed along with LiDAR data to determine the likelihood that a collection of LiDAR data points represents a hardwood or a conifer tree.

DETAILED DESCRIPTION

As discussed above, the disclosed technology relates to systems and methods for identifying different types of vegetation using remotely sensed data that are obtained from an area of interest. Although the technology is described for use in distinguishing conifer trees from hardwoods, it will be appreciated that the techniques described could also be applied to distinguishing between other types of vegetation.

The disclosed technology uses both aerial images and light detection and ranging (LiDAR) data to distinguish between different types of vegetation. For example, in an aerial image of a forest, hardwood trees may be obscured by taller conifers but be identifiable in LiDAR data that was obtained from the area of interest. Similarly, hardwoods in a riparian zone may produce lower intensity LiDAR data due to moisture and therefore be harder to differentiate from conifers with LiDAR data but are visible in aerial images. By using a combination of data from aerial images and LiDAR data, a computer is better able to predict whether a tree is likely a conifer or a hardwood.

Figure 1:
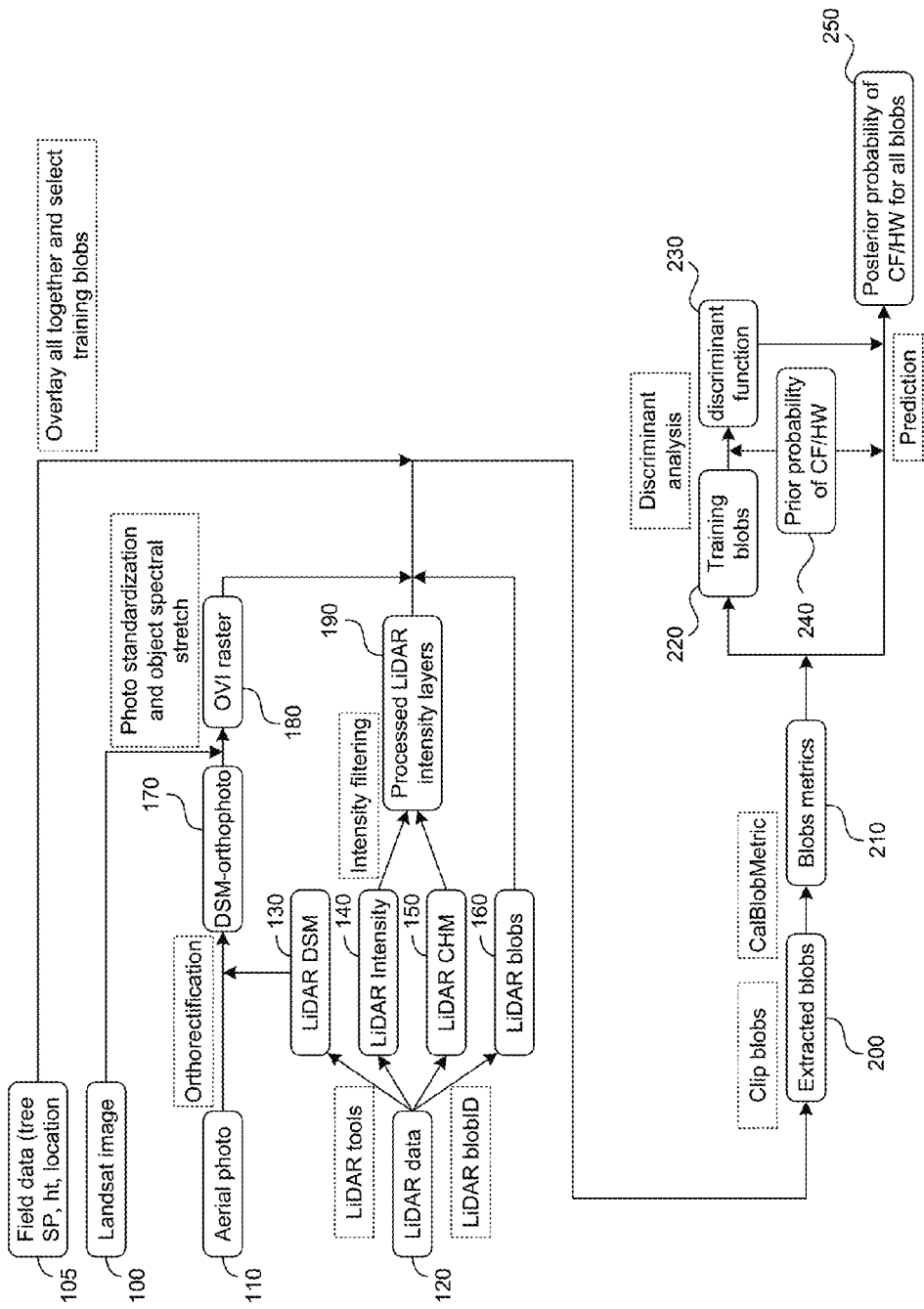
FIG. 1 is a flow diagram of steps performed by a programmed computer system to differentiate between different types of trees in an area of interest using a combination of remotely sensed data in accordance with one embodiment of the disclosed technology.
Figure 9:
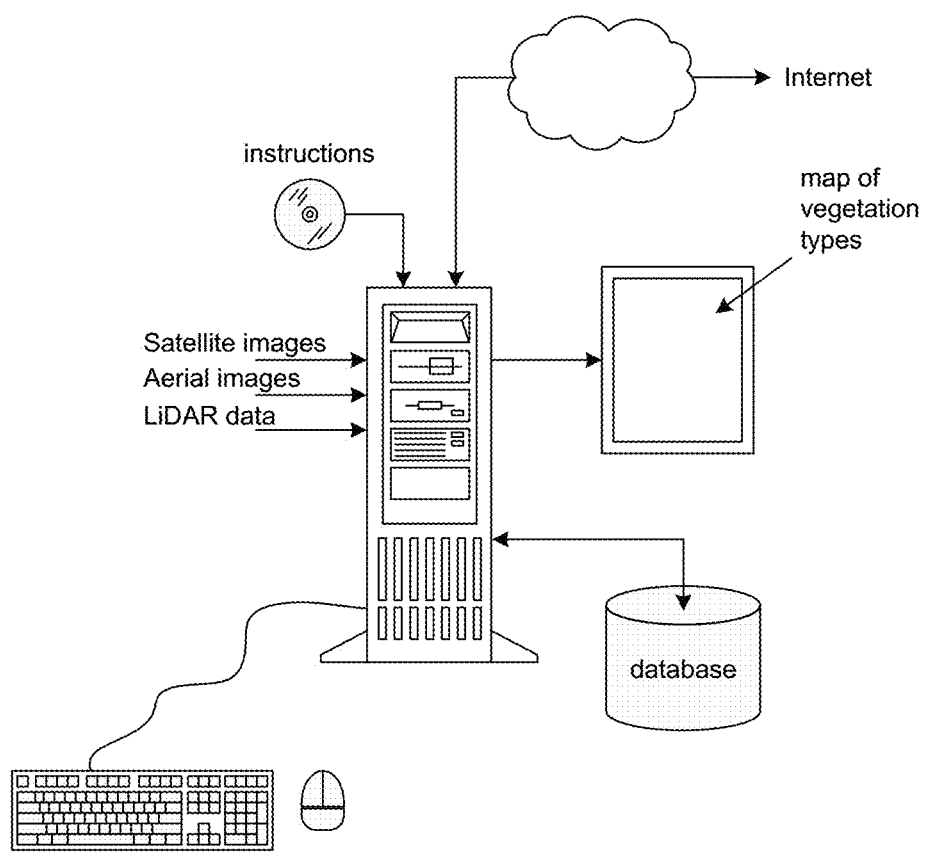
FIG. 9 illustrates a representative computer system used to implement the disclosed technology.

FIG. 1 shows a flow diagram of steps performed to distinguish between different types of vegetation in accordance with an embodiment of the disclosed technology. In one embodiment, the steps are performed by a programmed computer system (as shown in FIG. 9) of the conventional type having one or more programmable processors, memory, one or more I/O devices (keyboard, mouse, video display, printer etc.) and communications (LAN, Wi-Fi, Internet, Bluetooth etc.). The one or more processors are programmed with instructions that are stored on a non-transitory computer readable media (flash drive, CD, hard drive, SSD etc.) or received from a remote location over a computer communication link such as the Internet. Although the steps are described in a particular order for ease of explanation, it will be appreciated that the steps could be performed in a different order or that different steps could be performed in order to achieve the functionality described.

The one or more processors of the computer system execute the instructions to receive images of an area of interest, which is typically a forest region. The images include a satellite image 100 (e.g. Landsat or an equivalent) that covers the area of interest and one or more aerial images 110 that cover all of or a portion of the area of interest. In addition, the computer system receives LiDAR data 120 obtained from the area of interest. In some instances, the computer may also receive ground truth data 105 from the area of interest. The ground truth data 105 can include data about the species of trees, their height and location that have been verified by foresters who physically survey a portion of the area of interest.

As will be explained below, the ground truth data 105 is used to train the computer system to be able to distinguish different types of vegetation based on data metrics obtained from the aerial images 110 and LiDAR data 120. Alternatively, the metrics may have been previously determined by another computer and then be used to classify LiDAR data as one type of vegetation or another.

In one embodiment, the computer analyzes the LiDAR data 120 to produce three maps or grids of points including a digital surface model (DSM), a LiDAR intensity raster, and a LiDAR canopy height model (CHM). As will be appreciated by those skilled in the art of remote sensing, LiDAR data include x, y and z (height) coordinates for each detected LiDAR point as well as an intensity for each detected LiDAR return. The digital surface model (DSM) is a plot of the elevation of a tree canopy over the area of interest. LiDAR returns from ground level are removed from the DSM. A digital elevation model (DEM) is a plot of the ground elevation determined from the LiDAR data. The canopy height model (CHM) is a plot of the heights of the tree tops with the detected ground elevation removed. Therefore, the CHM can be calculated by subtracting the DEM from the DSM (CHM=DSM−DEM).

The computer system also analyzes the LiDAR data from the region of interest and calculates or divides the LiDAR data points into polygons that likely represent a single item of vegetation (e.g. a single tree). In one embodiment, the computer system uses the method described in commonly assigned U.S. Pat. No. 7,474,964, which is herein incorporated by reference in its entirety. Briefly stated, the method described in the '964 patent sorts LiDAR data by height and then based on the height of a data points, allocates an initial area or polygon to an item of vegetation (referred to as a crown umbrella). The method of the '964 patent then analyzes additional neighboring LiDAR data points to see if they lie within the area of a previously defined item of vegetation and if so, adds a smaller area (referred to as a digital branch umbrella) to the polygon defining the item of vegetation. If not, a new item of vegetation may be defined. The area of an individual item of vegetation (e.g. a tree) is therefore defined by the non-overlapping areas of its digital crown umbrella and all its digital branch umbrellas. The group of LiDAR points that are determined to represent a single item of vegetation is referred to as a "blob" for lack of a better name.

The computer also executes instructions to orthorectify the aerial images of the area of interest. Orthorectification is a process of correcting the aerial images for distortion caused by the optics of the camera used to obtain the images. The process of orthorectification of an aerial image is well known to persons of ordinary skill in the art.

Figures 2A, 2B:
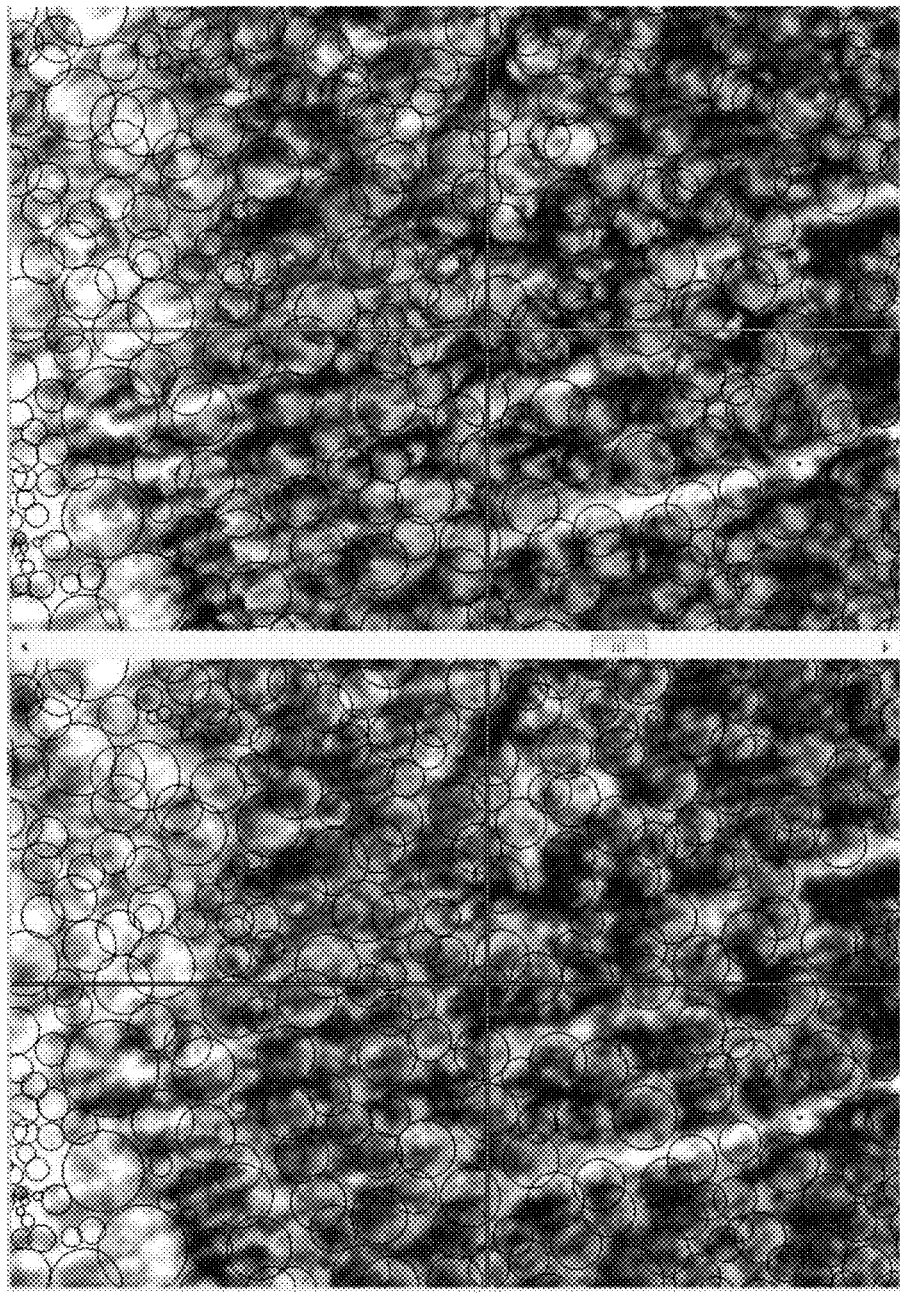
FIGS. 2A and 2B show a comparison of an aerial image that is orthorectified with a digital elevation model (DEM) obtained from LiDAR data versus the same aerial image that is orthorectified with a digital surface model (DSM) obtained from LiDAR data.

In one embodiment, the aerial images are orthorectified using data from the LiDAR digital surface model (DSM) rather than the digital elevation model (DEM). FIGS. 2A and 2B show the LiDAR blob polygons (circles) overlaid on an aerial image that was orthorectified with the LiDAR DEM (FIG. 2A) versus the blob polygons overlaid on the aerial image that was orthorectified with the DSM data (FIG. 2B). In FIG. 2A, many of the polygons defining the LiDAR blobs (the circles) are positioned over shadow regions in the image whereas in FIG. 2B, the blob polygons are more often centered over a tree crown. Therefore, it is preferable to orthorectify the aerial image using the DSM obtained from LiDAR data.

Figure 5:
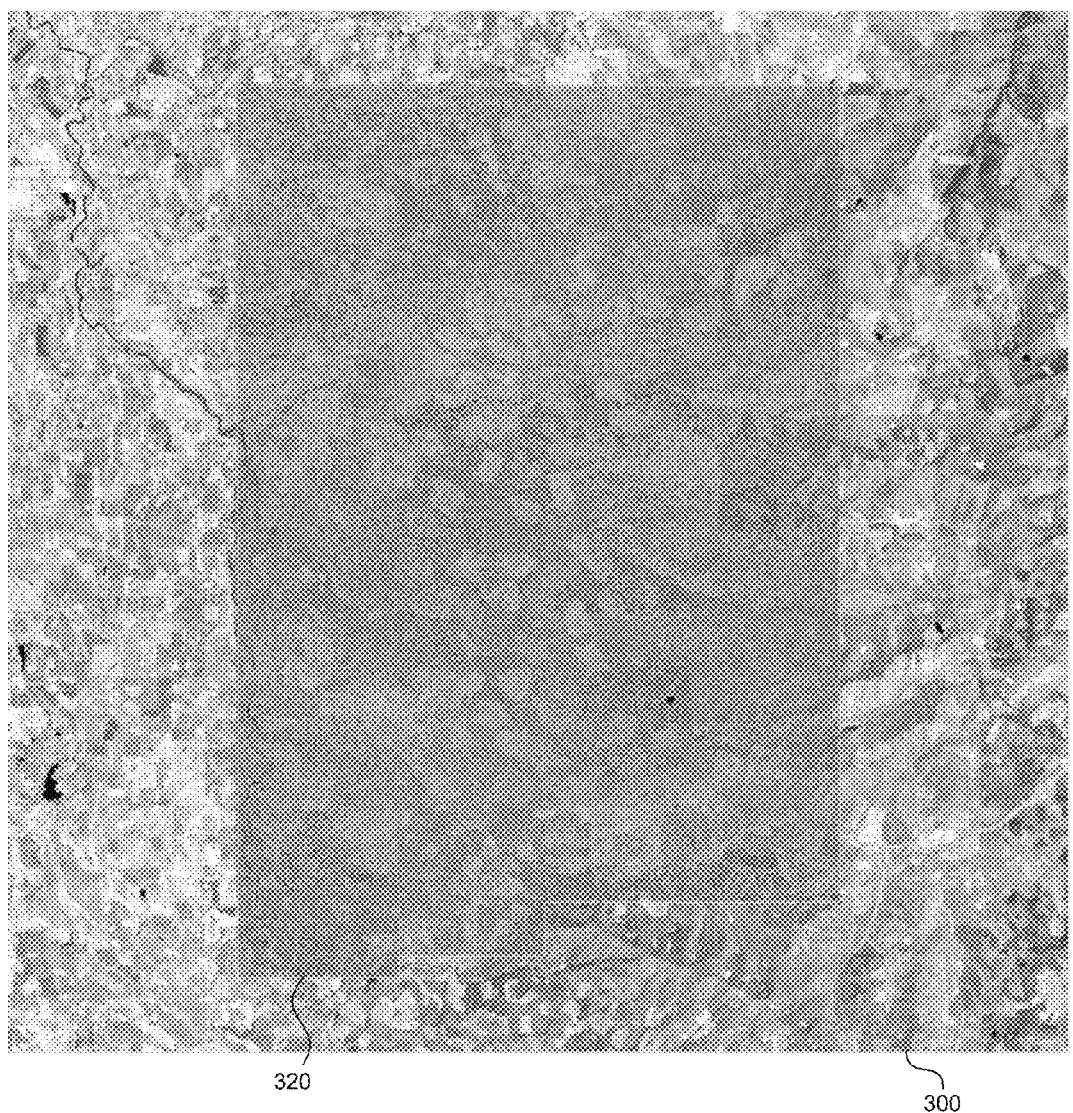
FIG. 5 shows the mosaic of aerial images that have been standardized using spectral data from the satellite image in accordance with an embodiment of the disclosed technology.

Because the field of view of an aerial image is often less than the region of interest, it may be necessary to stitch together a number of aerial images into a mosaic in order to cover the entire region of interest. Due to differences in illumination when the individual aerial images were obtained, the appearance of the individual aerial images used to cover the area of interest may differ slightly. Therefore, in one embodiment, the computer system is also programmed to execute instructions to standardize the images so that they appear more like one another. FIG. 5 shows a satellite image having a polygon (more or less rectangular) defining the area of interest where hardwoods are to be distinguished from conifers.

Figure 3:
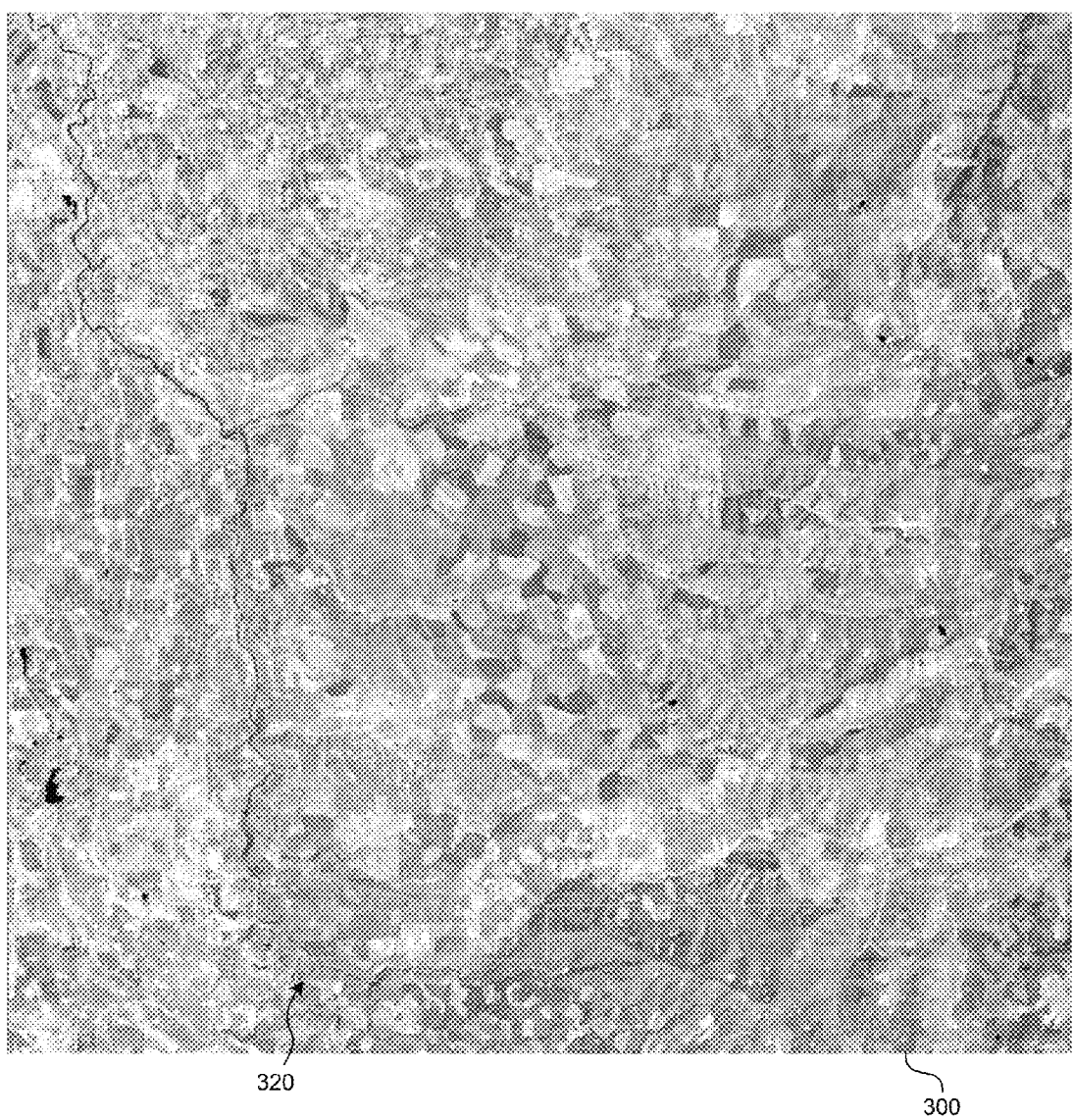
FIG. 3 shows a satellite image with a polygon defining an area of interest.
Figure 4:
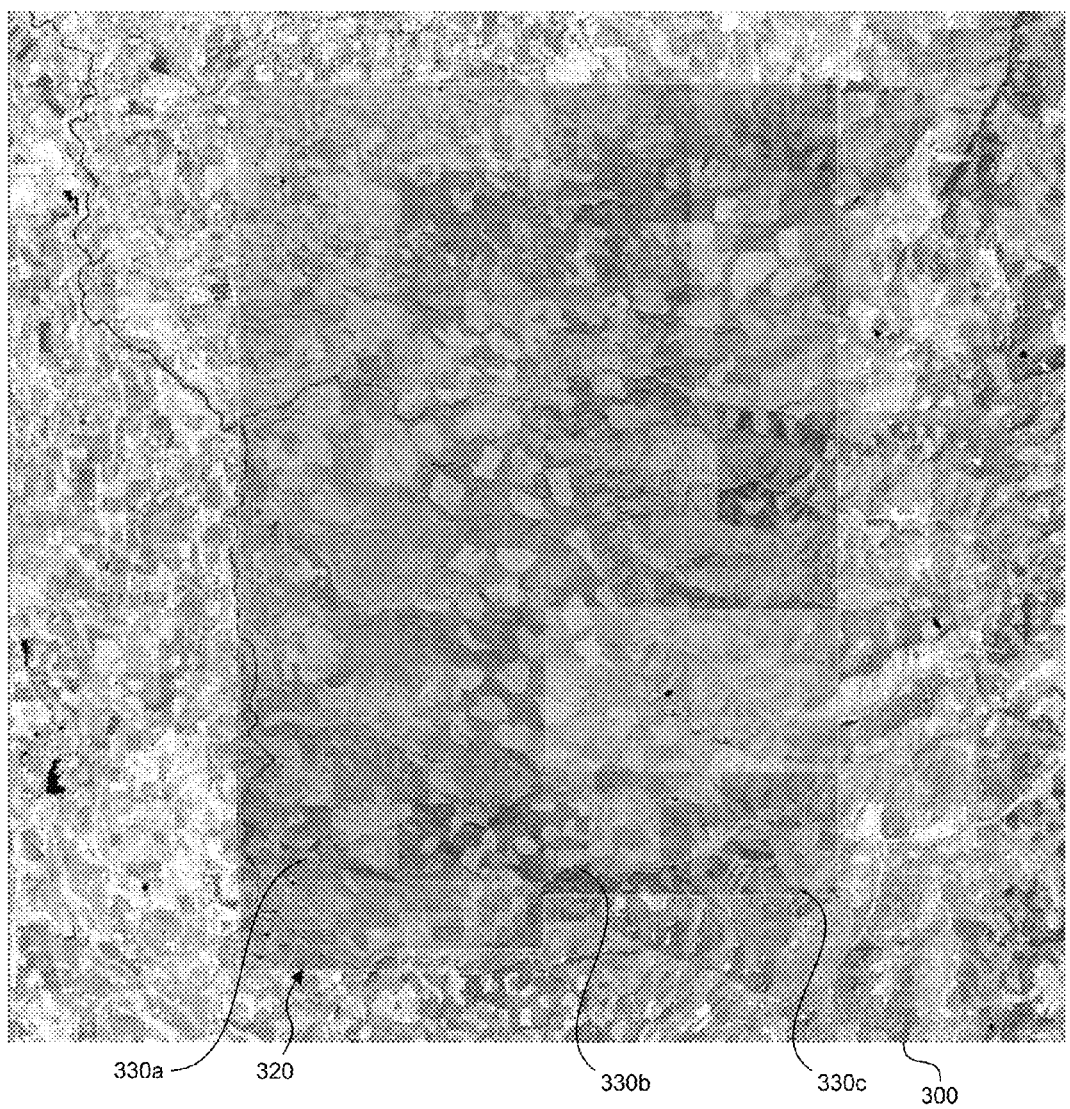
FIG. 4 shows a mosaic of aerial images overlaid on the satellite image and differences in the appearance of the individual aerial images that comprise the mosaic.

FIG. 3 shows a false color satellite image 300 produced with spectral data from the near infrared (NIR), red and green bands of a Landsat image. A polygon 320 shows an area of interest in the satellite image 300. FIG. 4 shows a number of aerial images 330a, 330b, 330c etc. that are stitched together into a mosaic to cover the area of interest. In the example shown, 58 rectangular aerial images 330 are used to cover the entire area of interest defined by the polygon 320. Slight differences in the spectral values of the individual aerial images allow the boundaries of the aerial images to be visible in the mosaic. Therefore, in one embodiment, the computer system executes instructions to standardize the distribution of pixel intensities of the aerial images in order to lessen the spectral variations.

Figure 6:
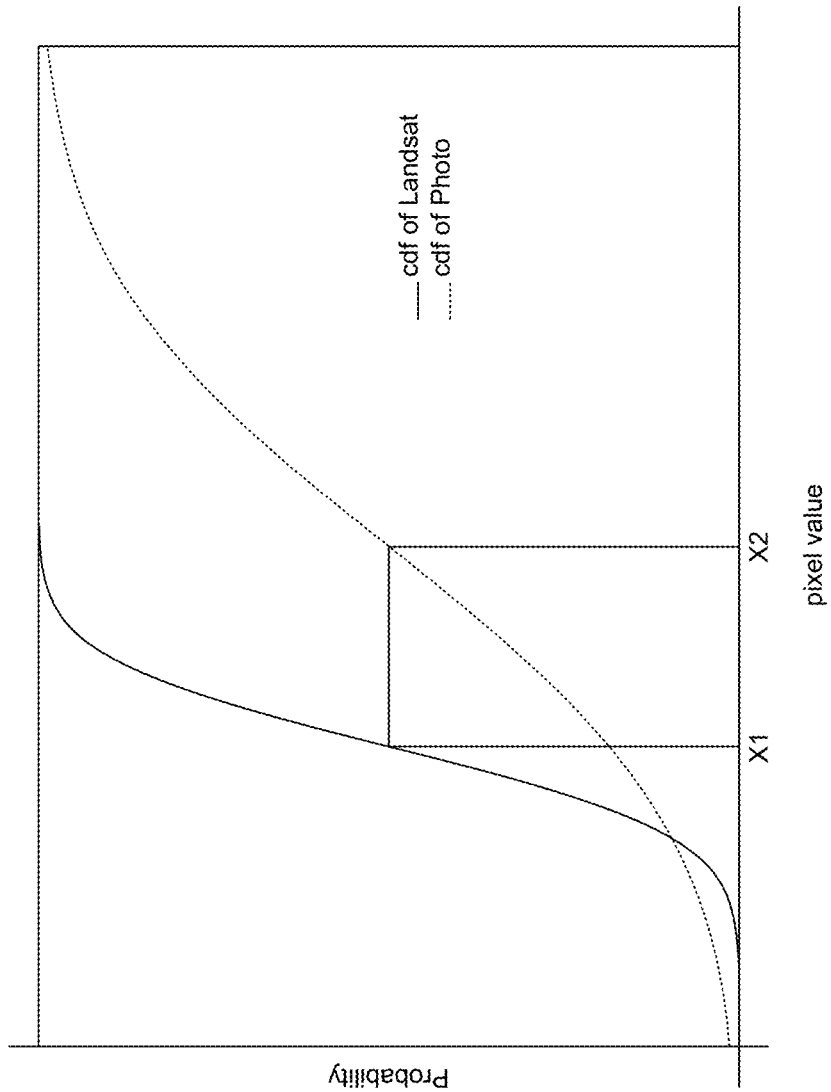
FIG. 6 shows cumulative distribution functions for pixel data in a satellite image and for pixel data in an aerial image that are used to standardize the aerial images that comprise the mosaic.

In accordance with one embodiment of the disclosed technology, the aerial images are standardized so that their cumulative distribution function (CDF) of pixel values matches that of a satellite image that includes the area of interest. FIG. 6 shows a curve 350 for the CDF of a satellite image and curve 352 for the CDF of an aerial image. CDF curves are computed for the spectral bands contained in the image data that are used to create the false color images (e.g. NIR, red and green). Each point on the CDF curve represents the probability that a pixel in the image has a particular spectral intensity value. The curves are plotted by counting the number of pixels in the image that have a particular value of spectral intensity or less divided by the total number of pixels in the image. For example, if point X1 represents the spectral intensity value of 96 (on a scale from 0-255), then the corresponding point on the CDF curve 350 is determined by counting the number of pixels having a spectral intensity value of less than or equal to 96 divided by the total number of pixels in the image.

The computer system then executes instructions to match the CDF curves of the aerial images to those of the satellite image. In the example shown in FIG. 6, if the point X2 has a value of 134, then each pixel in an aerial image having a spectral value of 134 is changed to have the value of the corresponding CDF curve for the satellite image (e.g. 96). In one embodiment, the same curve matching is performed for all the aerial images on a curve by curve basis (e.g. all the data for the NIR spectral bands for each aerial image are subjected to the same translation, all the data for the red spectral bands are subjected to the same translation etc.)

Although the disclosed embodiment of the technology standardizes the aerial images to a satellite image using CDF curve matching, it will be appreciated that other statistical methods could be used to minimize differences in the spectral data of the aerial images used to cover the region of interest.

FIG. 5 is a false color image showing the aerial images that form a mosaic over the area of interest. Comparing FIG. 5 with FIG. 4, it can be seen that the edges of the individual aerial images 330 that comprise the mosaic are harder to see. Therefore, the spectral differences between the images have been lessened.

Once the aerial images have been standardized, the computer system is programmed to stretch the pixel data for the NIR band in the aerial images in the manner described in U.S. patent application Ser. No. 14/142,341 filed Dec. 27, 2013 and herein incorporated by reference in its entirety. Briefly explained, the NIR data for each pixel in an aerial imaged is stretched such that any NIR data value below a threshold that does not likely represent vegetation is made equal to zero and any value above the threshold is remapped to a larger scale so that slight differences between unstretched NIR data values are spread out over the new larger scale.

Once the NIR spectral data has been stretched, the stretched NIR data for each pixel is divided by the standardized red spectral data for the same pixel in order to calculate an OVI (Objective-stretched Vegetation Index) value for the pixel. The OVI value of the pixel in the aerial image can be added to the pixel data for the image or stored in a separate OVI map for the aerial image.

In another embodiment, the stretched NIR data can be divided by the non-standardized red spectral data for a pixel. However, it has been found that using the standardized red spectral produces more accurate results.

The computer is then programmed to execute instructions to smooth the data in the LiDAR intensity map 140 with a moving window whose size is determined by the height of a corresponding data point in the canopy height model (CHM). The higher the height of a data point in the CHM, the larger the size of the moving window used to average the LiDAR data in the intensity map. Once the window size is determined, the window is centered over a data point in the LiDAR intensity map and all LiDAR data points encompassed by the window are sorted by LiDAR data point intensity then the pixel value in the center of the moving window is replaced with the median intensity of LiDAR data points encompassed by the window. The particular relation between the size of the window and the height of a data point in the CHM may be determined empirically or using a user input and may be species or location dependent.

Figure 7A:
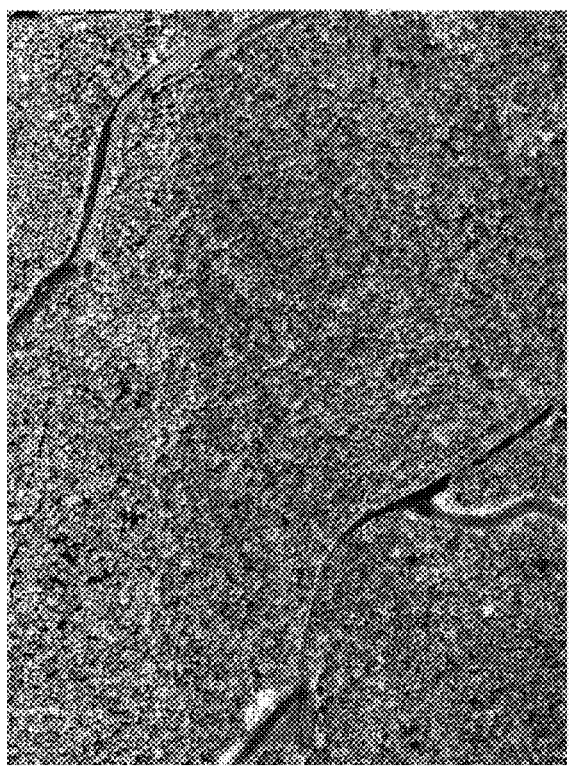
FIG. 7A shows a raw LiDAR intensity map and FIG. 7B shows a LiDAR intensity map that has been smoothed by a canopy height model (CHM) that is computed from LiDAR data in accordance with an embodiment of the disclosed technology.
Figure 7B:
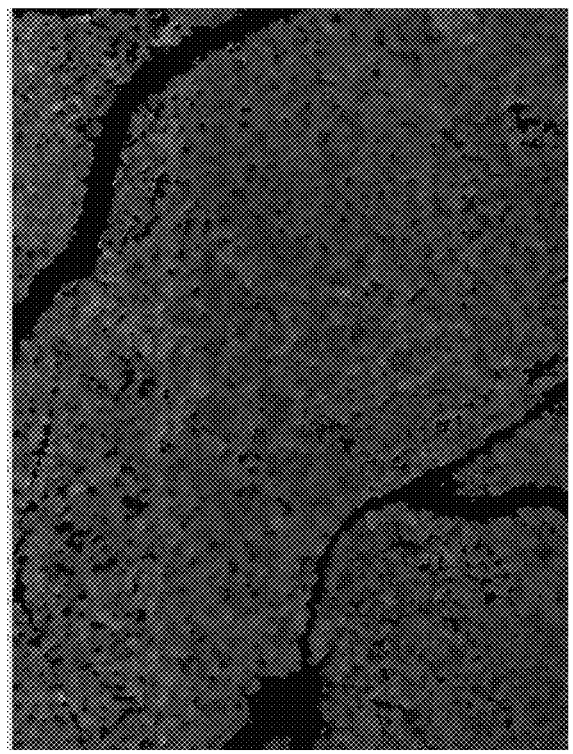

In some embodiments, averaging the LiDAR intensity data may be accomplished using a window of a fixed size. Alternatively, other methods may be used to smooth the LiDAR intensity data. FIG. 7A shows an example of an unsmoothed LiDAR intensity map and FIG. 7B shows the same LiDAR intensity map after smoothing with a moving window size that is dependent on the CHM.

The polygons that define the blobs are then used to define areas in the aerial images and in the filtered LiDAR intensity map in which to compute a mean OVI value and a mean averaged LiDAR intensity value for a single identified item of vegetation. These data values are then analyzed by the computer with a statistical function that predicts whether the LiDAR data points that make up the blob likely represent a hardwood or a conifer tree. In one embodiment, the statistical function is determined by correlating mean OVI values and mean filtered LiDAR intensity values computed for blobs that represent a tree whose species is known (e.g. with the ground truth data 105). The probability of any blob representing a hardwood or conifer can be predicted assuming multivariate normal distribution. In addition, the knowledge about hardwood/conifer distribution in the region of interest can be added as a prior probability 240 (FIG. 1) through the application of a Bayes rule. In one embodiment, a discriminant function 230 (FIG. 1) is used to predict the probability of a blob representing a conifer or a hardwood based on the mean OVI and mean averaged LiDAR intensity for the area of the blob.

Figure 8:
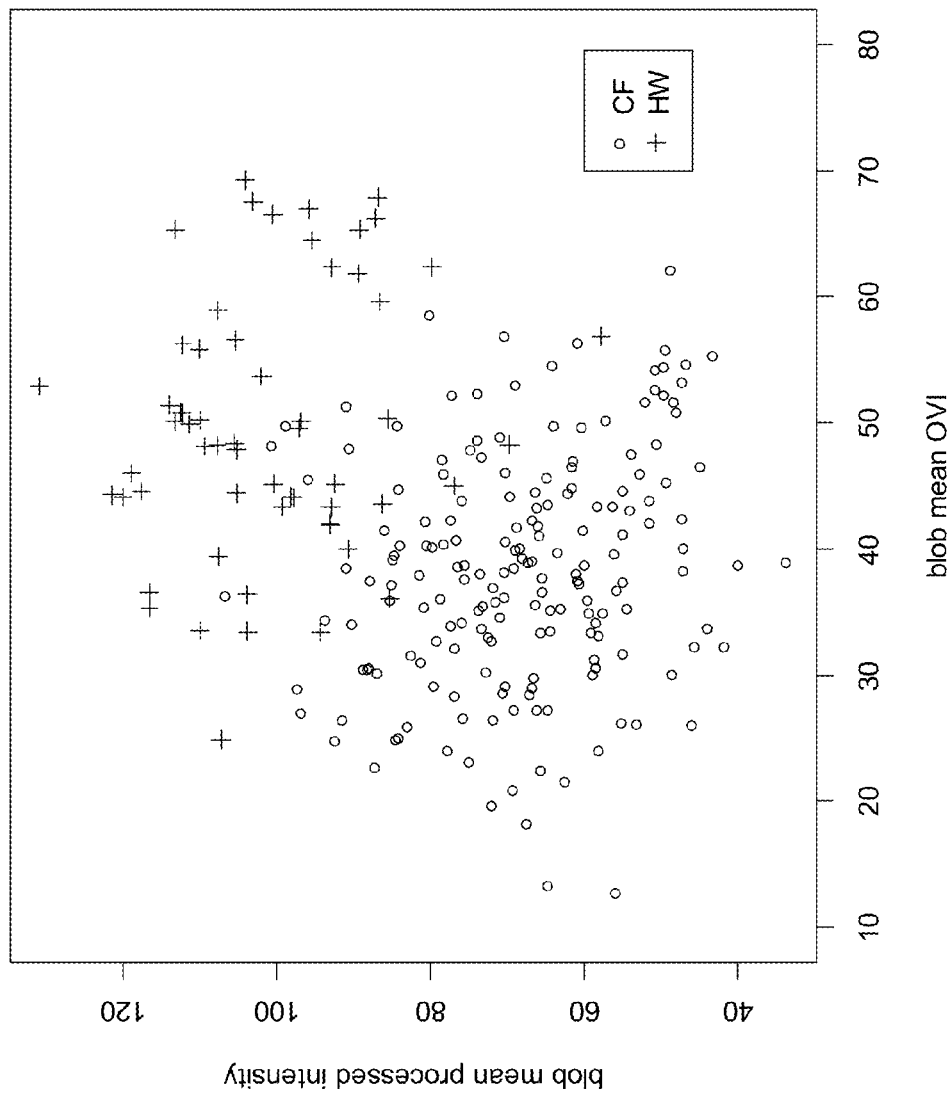
FIG. 8 is a plot of blob statistics computed for ground truth data that is used to develop metrics to distinguish between different types of vegetation in accordance with the disclosed technology.

FIG. 8 shows a plot of blob mean OVI and mean filtered intensity values for blobs who's tree species is known from ground truth data (circles representing conifers and plus signs representing hardwoods). By analyzing the data in the plot, a discriminant function or other statistical tool can be computed that can be used to determine the probability of LiDAR points representing a blob being a conifer or a hardwood based on the mean OVI and mean filtered LiDAR intensity.

Once the probability of a blob representing a conifer or a hardwood is determined, a count of hardwoods or conifers in the area of interest can be increased and used to inventory the trees in the area of interest. This data can be stored on a computer, printed, sent to a remote location etc. to provide an analysis of the how much of each type of vegetation is found in the area of interest In addition, color-coded or other maps of the area of interest can be produced that show where the different types of vegetation have been detected.

From the foregoing, it will be appreciated that specific embodiments of the invention have been described herein for purposes of illustration, but that various modifications may be made without deviating from the scope of the invention. For example, although the disclosed technology has been described with respect to differentiating hardwoods from conifers in a region of interest, it would be appreciated that the techniques described could be used to distinguish between other types of vegetation. For example, the disclosed technology can be trained to differentiate forest types, or differentiate between different conifer species.

Accordingly, the invention is not limited except as by the appended claims.

We claim:
1. A computer system including:
a memory for storing a number of program instructions;
one or more processors configured to execute the instructions in order to
divide LiDAR data from an area of interest into a number of groups (blobs) representing individual items of vegetation;
stretch near infrared (NIR) data from an aerial image of the area of interest such that NIR data having a value that is within a range that can represent vegetation is remapped to a larger range;
compute an objective-stretched vegetation index (OVI) value for a pixel by dividing the stretched NIR value for a pixel by the red spectral value for the pixel;
compute a mean OVI value for the pixels in the area of the blob;
compute a mean filtered LiDAR intensity value for LiDAR data points received from the area of the blob; and
use the mean OVI and mean filtered LiDAR intensity values in the area of the blob to predict what type of vegetation is represented by the area of the blob.

2. The computer system of claim 1, wherein the one or more processors of the computer system are configured to execute instructions to predict whether an area of a blob represents a hardwood or a conifer.

3. The computer system of claim 1, wherein the one or more processors are configured to execute instructions to compute the mean filtered LiDAR intensity values by sorting and finding the median LiDAR intensity values in an area of a window that is sized depending on a height of the Li DAR data point at the center of the window.

4. The computer system of claim 1, wherein the size of the window gets bigger as the height of the Li DAR data point at the center of the window increases.

5. The computer system of claim 1, wherein the aerial image is standardized so that its distribution of pixel intensities in different spectral bands is similar to the distribution of pixel intensities of a satellite image that includes the area of interest.

6. The computer system of claim 1, wherein the area image is orthorectified using LiDAR data in a LiDAR digital surface model.

7. A non-transitory computer readable media including a number of program instructions that are executable by a processor to:
- divide LiDAR data from an area of interest into a number of groups (blobs) representing individual items of vegetation;
- stretch near infrared (NIR) data from an aerial image of the area of interest such that NIR data having a value that is within a range that can represent vegetation is remapped to a larger range;
- compute an objective-stretched vegetation index (OVI) value for a pixel by dividing the stretched NIR value for a pixel by the red spectral value for the pixel;
- compute a mean OVI value for the pixels in the area of the blob;
- compute a mean filtered LiDAR intensity value for LiDAR data points received from the area of the blob; and
- use the mean OVI and mean filtered LiDAR intensity values in the area of the blob to predict what type of vegetation is represented by the area of the blob.

* * * * *

UNITED STATES PATENT AND TRADEMARK OFFICE
CERTIFICATE OF CORRECTION

PATENT NO. : 9,477,899 B2  
APPLICATION NO. : 14/297039  
DATED : October 25, 2016  
INVENTOR(S) : Yuzhen Li et al.

Page 1 of 1

It is certified that error appears in the above-identified patent and that said Letters Patent is hereby corrected as shown below:

In the Specification

In Column 1, Line 65, after "mosaic;" delete "and".

In Column 3, Line 20, delete "Li DAR" and insert -- LiDAR --, therefor.

In the Claims

In Column 6, Line 59, in Claim 3, delete "Li DAR" and insert -- LiDAR --, therefor.

In Column 6, Line 61, in Claim 4, delete "Li DAR" and insert -- LiDAR --, therefor.

Signed and Sealed this  
Third Day of January, 2017

Michelle K. Lee  
*Director of the United States Patent and Trademark Office*